(12) United States Patent
Perstnev et al.

(10) Patent No.: US 11,054,077 B2
(45) Date of Patent: *Jul. 6, 2021

(54) SYSTEMS, COMPOSITIONS AND METHODS FOR CURING LEAKAGES IN PIPES

(71) Applicant: CURAPIPE SYSTEM LTD., Ashkelon (IL)

(72) Inventors: Samuel Perstnev, Mercaz Shapira (IL); Boris Natapov, Ashkelon (IL); Alexander Perstnev, Ashkelon (IL); Reonald Ukhanov, Ashkelon (IL)

(73) Assignee: CURAPIPE SYSTEM LTD., Ashkelon (IL)

( * ) Notice: Subject to any disclaimer, the term of this patent is extended or adjusted under 35 U.S.C. 154(b) by 51 days.

This patent is subject to a terminal disclaimer.

(21) Appl. No.: 16/372,431

(22) Filed: Apr. 2, 2019

(65) Prior Publication Data

US 2019/0226619 A1    Jul. 25, 2019

Related U.S. Application Data

(63) Continuation-in-part of application No. 15/535,717, filed as application No. PCT/IL2015/000053 on Dec. 16, 2015, now Pat. No. 10,288,206.

(60) Provisional application No. 62/093,839, filed on Dec. 18, 2014.

(51) Int. Cl.
  *F16L 55/16*  (2006.01)
  *F16L 55/164* (2006.01)
  *C08L 63/04*  (2006.01)
  *F16L 55/12*  (2006.01)
  *C09K 3/10*   (2006.01)

(52) U.S. Cl.
  CPC .......... *F16L 55/1612* (2013.01); *C08L 63/04* (2013.01); *F16L 55/12* (2013.01); *F16L 55/164* (2013.01); *C09K 3/1028* (2013.01)

(58) Field of Classification Search
  CPC . F16L 55/1283; F16L 55/1612; F16L 55/164; F16L 55/38; F16L 55/42
  USPC ......................................................... 138/97
  See application file for complete search history.

(56) References Cited

U.S. PATENT DOCUMENTS

| | | | | |
|---|---|---|---|---|
| 3,144,049 A | * | 8/1964 | Ginsburgh | E21B 33/138 138/97 |
| 3,473,572 A | * | 10/1969 | Nielson | B08B 9/0555 137/802 |
| 3,556,831 A | * | 1/1971 | Schinabeck | C09K 3/12 427/142 |
| 4,582,091 A | * | 4/1986 | Ells | F16L 55/164 138/97 |
| 5,389,155 A | * | 2/1995 | Lima | B08B 9/0553 134/8 |

(Continued)

*Primary Examiner* — Craig M Schneider
*Assistant Examiner* — David R Deal
(74) *Attorney, Agent, or Firm* — Eva Taksel (57) ABSTRACT

The present invention provides a method for sealing a leakage at a remote site in a pipe, the method including introducing a fluid carrier composition including a hardener, a resin and at least one of a multiplicity of plugging devices and a multiplicity of cut fibers into the pipe at the first site under pressure and allowing the fluid carrier to transport the at least one of the multiplicity devices and the multiplicity of fibers to the remote site, wherein the at least of the multiplicity of devices and the multiplicity of the cut fibers penetrates the leakage thereby sealing and curing the leakage.

19 Claims, 8 Drawing Sheets

(56) References Cited

U.S. PATENT DOCUMENTS

| | | | | |
|---|---|---|---|---|
| 8,936,085 B2* | 1/2015 | Boney | ...................... | E21B 33/13 |
| | | | | 166/284 |
| 8,950,438 B2* | 2/2015 | Ryan | ................... | F16L 55/1645 |
| | | | | 138/98 |
| 9,212,535 B2* | 12/2015 | Tippel | ................... | E21B 33/138 |
| 9,435,482 B2* | 9/2016 | Ryan | ....................... | F16L 55/48 |
| 9,718,985 B2* | 8/2017 | Maeda | ................... | B05D 3/102 |
| 10,330,236 B2* | 6/2019 | Czaplewski | .......... | F16L 55/132 |
| 2019/0211139 A1* | 7/2019 | Robertson | .............. | C08G 59/66 |

* cited by examiner

SYSTEMS, COMPOSITIONS AND METHODS FOR CURING LEAKAGES IN PIPES

FIELD OF THE INVENTION

The present invention relates generally to pipeline leakages, and more specifically to methods and apparatus for curing pipeline leakages.

BACKGROUND OF THE INVENTION

Many liquids are transported via subterranean/underwater pipelines. When a leakage crack or hole forms is the pipeline, the liquid leaks therefrom. Often, it takes a long time to detect a leakage and yet longer to locate the leakage site. Oil, gas and water transportation are thus subject to tremendous losses due to pipeline leakage.

There is thus a need to maintain and seal subterranean/underwater pipelines quickly in situ.

Several patent publications in the field include U.S. Pat. No. 3,523,826A, which relates to a process for cleaning a piping system which is characterized by circulating in, and through said system a thixotropic emulsion having a hi.-h volume ratio of internal phase to external phase, the emulsion having an emulsifying agent, an emulsifiable oil and a non-oil, the emulsion being an oil-in-non-oil or a non-oil-in-oil emulsion, the internal phase of said emulsion being present in said emulsion in an amount of at least 80% by volume of the emulsion, said emulsion having the characteristics of a solid when at rest and the characteristics of a liquid when a force is exerted on it, said emulsion tending to be non-adhesive, said emulsion having a critical shear point sufficient to permit pumping at high rates, and said emulsion having an apparent rest viscosity greater than about 1000 cps.

U.S. Pat. No. 4,216,026 describes a method for removing fluid and/or particulate debris from a pipeline, a Bingham plastic fluid plug is passed through a pipeline and the fluid and/or debris are collected by the plug. The plug is pushed through the pipeline with a scraper which in turn may be pushed by liquid or gas pressure. Where the fluid to be removed is water, the Bingham plastic fluid plug employed preferably is a composition of water and a xanthan gum, and the gum may be cross-linked with a multivalent metal. Where the fluid to be removed is a hydrocarbon, the Bingham plastic fluid plug employed preferably is a composition of a mineral oil and an organo-modified smectite, and may also include a particulate filler such as powdered coal.

U.S. Pat. No. 4,252,465A describes a gel plug, which is employed during construction of an offshore pipeline to separate a gas-filled portion of the pipeline from a water-flooded portion, and to facilitate control and movement of the gas/gel plug/water interface as desired to assist in construction operations.

U.S. Pat. No. 4,254,559A relates to an interior surface of a pipeline being dried by sequentially passing through the pipeline (a) an aqueous cross-linked gelled pig, (b) a fluid mobility buffer comprising a non-crosslinked gelled ankanol of from one to three carbon atoms, (c) a dessicating amount of a liquid alkanol from one to three carbon atoms. For example, a pipeline was dried by sequentially passing through it (a) a borate cross-linked hydroxypropyl guar gum pig, (b) a fluid mobility buffer comprising methanol thickened with hydroxypropyl cellulose, and (c) methanol.

U.S. Pat. No. 4,379,722 discloses a gel plug of mineral oil, organo-modified smectite, and a particulate filler such as powdered coal, or a gel plug of mineral oil and organo-modified smectite is employed during construction of an off-shore pipeline to separate a gas-filled portion of the pipeline from a water-flooded portion, and to facilitate control and movement of a gas/gel plug/water interface as desired to assist in construction operations.

U.S. Pat. No. 4,416,703 describes a method to remove particulate debris from a pipeline, a plug train including at least one gel plug having debris entraining characteristics and at least one pseudoplastic plug is passed through a pipeline and the debris is collected by the gel plug. The gel plug is pushed through the pipeline with a scraper which in turn may be pushed by liquid or gas pressure.

U.S. Pat. No. 4,321,968A discloses gelled compositions comprising carboxymethylhydroxyethyl cellulose in aqueous brine solutions, which are gelled by the addition of an alkaline earth metal hydroxide such as calcium hydroxide. The gelled compositions have utility as water diversion agents, pusher fluids, fracturing fluids, drilling muds, workover fluids, and completion fluids.

U.S. Pat. No. 5,346,339A provides a method of cleaning a pipeline using a gel pig of a graft copolymer of a hydroxyalkyl cellulose prepared by a redox reaction with vinyl phosphonic acid. The gel pig is formed by hydrating the graft copolymer in an aqueous liquid. The gel pig is crosslinked by the addition of a Lewis base or Bronsted-Lowry base, to the gel in an amount sufficient to initiate crosslinking of the graft copolymer. Contaminants entrained in the crosslinked gel pig during the cleaning process may be separated by the addition of a pH reducing agent to the pig whereby the viscosity of the gel is caused to decrease. The gel may be used for further cleaning after contaminant separation by addition of an additional quantity of the Lewis base or Bronsted-Lowry base.

WO2008081441 describes a method of repairing leakage in pipelines comprising the steps of forming a first and second openings in the pipeline upstream and downstream, respectively, of the leakage location, inserting through the first opening a first body, filling the space arrear of the first body (C1) with a first viscous sealing material (M1), inserting through the first opening a second body (C2) arrear of the first viscous sealing material (M1) compressing the first sealing material by applying a pressure against the first and the second bodies (C1, C2) in opposite directions, causing the first and second bodies (C1, C2) and the compressed first sealing material (M1) to move in unison in the direction of the second opening, and retrieving the first and second bodies (C1, C2). Preferably, the method is performed using three bodies (C1, C2, C3) and two sealing materials (M1, M2).

Prior art systems often have the following drawback, namely that hardening material which is not in the optimal ratio is fed into the pipeline. Additionally, after exposure of the material in the hole in the pipe, it can remain and may also exit pressure pipe. There are thus still many types of pipeline leakages, which cannot be cured using the aforementioned prior art materials and methods. There thus remains an urgent need to develop systems and methods for curing pipeline leakages.

SUMMARY OF THE INVENTION

It is an object of some aspects of the present invention to provide methods of forming plugging devices for use in systems and methods for sealing pipeline leakages.

The present invention provides a method for sealing a leakage at a remote site in a pipe, the method including introducing a fluid carrier composition including a hardener, a resin and at least one of a multiplicity of plugging devices and a multiplicity of cut fibers into the pipe at the first site under pressure and allowing the fluid carrier to transport the at least one of the multiplicity devices and the multiplicity of fibers to the remote site, wherein the at least of the multiplicity of devices and the multiplicity of the cut fibers penetrates the leakage thereby sealing and curing the leakage.

The present invention provides leakage plugging devices (also called plugs or chips or sealant plugs herein) and methods for sealing a leakage at a remote site in a pipe, the device including a polymeric carrier plug of a deformable material including pores and at least one sealant composition disposed in the pores, wherein the polymeric carrier plug is adapted to transport the at least one sealant composition from a first site to a remote site and to plug the leakage at the remote site.

There is thus provided according to an embodiment of the present invention, a method for sealing a leakage at a remote site in a pipe, the method including;
 a. introducing a fluid carrier composition including;
  i. a hardener;
  ii. a resin; and
  iii. at least one of a multiplicity of plugging devices and a multiplicity of cut fibers; and
 into the pipe at the first site under pressure; and
 b. allowing the fluid carrier to transport the at least one of the multiplicity devices and the multiplicity of fibers to the remote site, wherein the at least of the multiplicity of devices and the multiplicity of the cut fibers penetrates the leakage thereby sealing and curing the leakage.

Additionally, according to an embodiment of the present invention, the method further includes;
 curing the resin at the remote site.

Furthermore, according to an embodiment of the present invention, the method further includes forming at least one hardened increased-density device.

Moreover, according to an embodiment of the present invention, the method further includes forming at least one hardened increased-density fiber.

Additionally, according to an embodiment of the present invention, the method further includes;
 removing at least one of excess plugging devices and excess fibers and the at carrier composition from the pipe after the allowing step.

Further, according to an embodiment of the present invention, the sealing includes a curing step which takes 0.2 to ten hours.

Yet further, according to an embodiment of the present invention, the curing step occurs within twenty minutes to 4 hours.

Additionally, according to an embodiment of the present invention, the carrier plug or plugs are adapted to conform at least in part to a shape of the leakage at the remote site.

Furthermore, according to an embodiment of the present invention, the carrier plug or plugs are adapted to form a wedge shape.

Moreover, according to an embodiment of the present invention, in the allowing step further includes condensing the at least one of the devices at the leakage site.

Additionally, according to an embodiment of the present invention the leakage is selected from the group consisting of a hole, a crack, a vein, a crater and combinations thereof.

Further, according to an embodiment of the present invention, the leakage leaks 10 to 30,000 L/hr.

Yet further, according to an embodiment of the present invention the leakage leaks 50 to 5000 L/hr.

There is thus provided according to another embodiment of the present invention, a method for sealing multiple leakages at remote sites in a pipeline, the method including;
 a. introducing a fluid carrier composition, as described herein, into the pipeline at the first site under pressure; and
 b. allowing the fluid carrier composition to transport the at least one of multiplicity of plugging devices and the multiplicity of cut fibers to the remote sites, thereby sealing at least some of the leakages.

Importantly, according to an embodiment of the present invention the allowing step includes sealing all of the leakages.

Additionally, according to an embodiment of the present invention, the method further includes;
 c. curing the resin within the devices at the remote sites, thereby forming a plurality of hardened increased-density devices.

Additionally, according to an embodiment of the present invention, the method further includes repeating steps a and step b.

Furthermore, according to an embodiment of the present invention, the method further includes repeating step c after the steps a and step b.

Additionally, according to an embodiment of the present invention the method further includes flushing the fluid carrier composition from the pipe.

Moreover, according to an embodiment of the present invention, the flushing step leaves the pipe sealed with the hardened increased-density devices.

In other embodiments of the present invention, a method and system are provided for sealing water transport pipelines.

There is thus provided according to an embodiment of the present invention, a leakage plugging device for sealing a leakage at a remote site in a pipe, the device including;
 a. a polymeric carrier plug of a deformable material including pores; and
 b. at least one sealant composition disposed in the pores, wherein the polymeric carrier plug is adapted to transport the at least one sealant composition from a first site to a remote site and to plug the leakage at the remote site.

Additionally, according to an embodiment of the present invention, the device is of a first dimension and the leakage is of a second dimension.

Furthermore, according to an embodiment of the present invention, the first dimension is in a range of 0.1 mm to 100 mm.

Moreover, according to an embodiment of the present invention, the first dimension is in a range of 1 mm to 50 mm.

Further, according to an embodiment of the present invention, the first dimension is in a range of 2 mm to 15 mm.

Additionally, according to an embodiment of the present invention, the polymeric carrier plug is adapted to penetrate the remote site.

Preferably, according to an embodiment of the present invention, the polymeric carrier plug or a multiplicity of polymeric carrier plugs are adapted to fill at least one of a hole, a crack and breakage causing the leakage at the remote site.

Furthermore, according to an embodiment of the present invention, the polymeric carrier plug or a multiplicity of polymeric carrier plugs are adapted to be condensed at the remote site.

Yet further, according to an embodiment of the present invention, the at least one sealant composition resides within the condensed carrier plug or a multiplicity of polymeric carrier plugs to fill the leakage at the remote site.

Additionally, according to an embodiment of the present invention, the polymeric carrier plug is of a shape selected from the group consisting of wedge-shaped, rhomboid, cubic, polygon, spherical, ovular, egg-shaped, diamond-shaped and pyramid-shaped.

Moreover, according to an embodiment of the present invention, the polymeric carrier plug includes a polymer selected from the group consisting of a foamed material, a polyurethane material, an expanded material, a natural material and a biodegradable polymeric material.

Further, according to an embodiment of the present invention, the at least one sealant composition includes;
 a. an adhesive;
 b. a hardener; and
 c. at least one filler.

Additionally, according to an embodiment of the present invention, the deformable material includes polyurethane and the at least one sealant composition further includes a fatty acid liquid composition.

Furthermore, according to an embodiment of the present invention, the fatty acid liquid composition includes a vegetable oil.

Moreover, according to an embodiment of the present invention, the vegetable oil is selected from the group consisting of sunflower oil, safflower oil, corn oil, soybean oil, canola oil, olive oil and rapeseed oil.

Additionally, according to an embodiment of the present invention, the polymeric carrier plug is adapted to form a narrow head part and wider tail part, wherein the head part is lodged within a hole, a crack and breakage causing the leakage at the remote site.

Further, according to an embodiment of the present invention, a density of the device is increased at least threefold after plugging the site.

There is thus provided according to another embodiment of the present invention, a method for sealing a leakage at a remote site in a pipe, the method including;
 a. introducing a fluid carrier including a plurality of leakage plugging devices according to claim 1, into the pipe at the first site under pressure;
 b. allowing the fluid carrier to transport the devices to the remote site, wherein at least one the devices penetrates the leakage thereby sealing the leakage.

Additionally, according to an embodiment of the present invention, the method further includes;
 c. curing the at least one sealant composition within the devices at the remote site, thereby forming at least one hardened increased-density device.

Additionally, according to an embodiment of the present invention, the method further includes;
 d. removing excess plugging devices and sealant compositions from the pipe after the allowing step.

Moreover, according to an embodiment of the present invention, the sealing includes a hardening step followed by a curing step.

Additionally, according to an embodiment of the present invention, the hardening step occurs within twenty minutes and the curing step occurs within eight to twenty hours.

Furthermore, according to an embodiment of the present invention, the hardening step occurs within ten minutes and the curing step occurs within two hours.

Additionally, according to an embodiment of the present invention, the at least one gel pig includes;
 a. a cellulosic polysaccharide;
 b. an acid;
 c. a base; and
 d. water.

Additionally, according to an embodiment of the present invention, the at least one gel pig includes;
 a. a cellulosic polysaccharide;
 b. boric acid;
 c. a base; and
 d. water.

Additionally, according to an embodiment of the present invention, the at least one gel pig includes;
 a. hydroxypropyl guar gum;
 b. boric acid;
 c. a base; and
 d. water.
 e. water.

Additionally, according to an embodiment of the present invention, the at least one gel pig includes;
 a. hydroxypropyl guar gum;
 b. boric acid;
 c. sodium hydroxide; and
 d. water.

Additionally, according to an embodiment of the present invention, the at least one gel pig includes;
 a. 1-5% weight hydroxypropyl guar gum;
 b. 0.1-6% weight boric acid;
 c. 0.1-4% weight sodium hydroxide; and
 d. 70-99.5% weight water.

In some cases, the hardening step occurs within five minutes and the curing step occurs within one hour. The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The present invention provides systems and methods for repairing leaking pipes in situ, apparatus and systems for method implementation, materials and sealant compositions.

The pigs, sealant compositions, carrier fluid compositions and chips used in the present invention may be any described in the following patents/patent applications, incorporated herein by reference:—WO2008/081441, to Perstnev et al., WO2016042541A1, WO2016098093A1, WO2016098094A1, WO2016098095A1, U.S. Pat. Nos. 9,045,648, 9,738,798B2, US20170299108A1, US20170363245A1 and US20180003330A1.

By "seal" or "sealing", is meant stopping flow from a leakage site, such as a crack or hole.

By "cure" or "curing" is meant permanently preventing flow from a leakage site, such as a crack or hole, for at least one month.

The present invention provides leakage plugging devices and methods for sealing a leakage at a remote site in a pipe, the device including a polymeric carrier plug of a deformable material including pores and at least one sealant composition disposed in the pores, wherein the polymeric carrier plug is adapted to transport the at least one sealant composition from a first site to a remote site and to plug the leakage at the remote site.

Prior art systems often have the following drawback, namely that hardening material which is not in the optimal ratio is fed into the pipeline. Additionally, after exposure of the material in the hole in the pipe, it can remain and may also exit pressure pipe.

One of the aims of the present invention is to eliminate the drawbacks of the prior art, that is, the development of a reliable pipe repair process from the inside, as well as development of basic devices, materials and other items needed for reliable pipe repair in real conditions.

When the carrier plugs that are suspended in a composite sealant composition approach the holes in the pipe, they go into the holes and plug them. The remaining plugs and composition are ejected from the pipe and disposed of. Carrier plugs, which have come through the holes in the pipe after the specified time harden and form strong plug, termed herein leakage plugging devices. The pipe is cleaned from residues of the additional material/sealant compositions and plugs. This leaves the final pipeline repaired with in situ leakage plugging device(s) and no/negligible leakage.

Figure 1A:
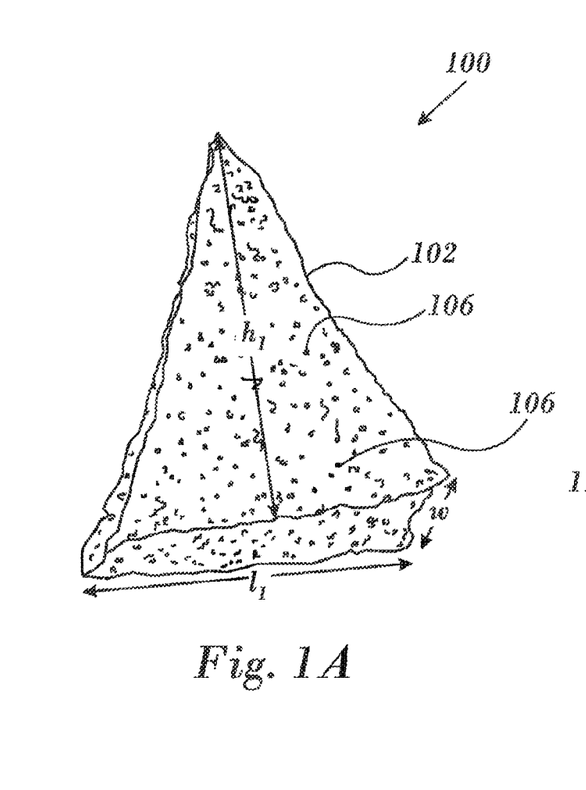
FIGS. 1A-1C show simplified images of a leakage plugging device for in situ repair of a pipe, in accordance with an embodiment of the present invention.
Figures 1B, 1C:
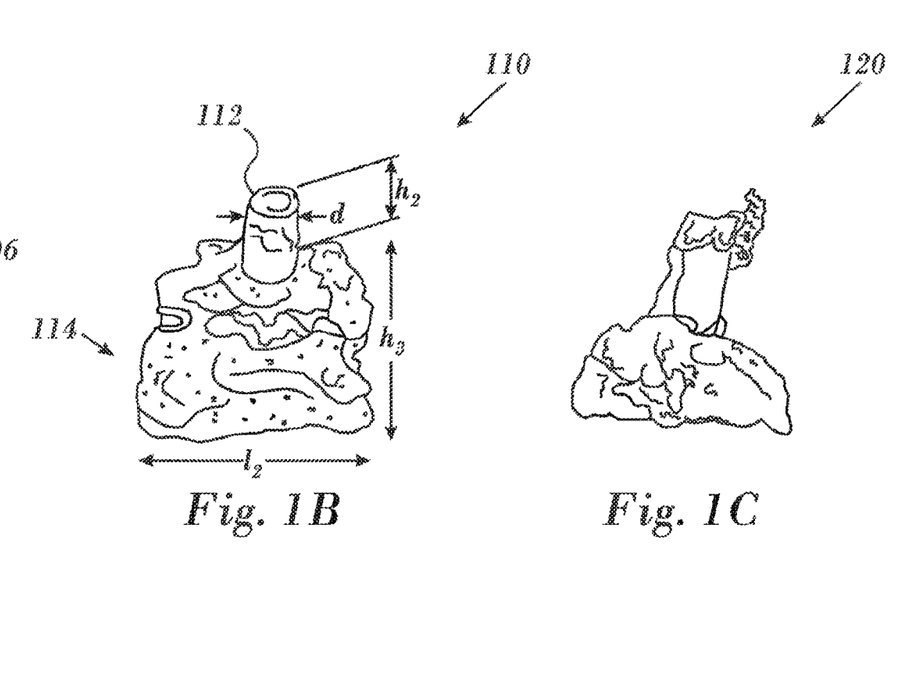

Reference is now made to FIGS. 1A-1C, which show simplified images of a leakage plugging device 100, 110, 120, for in situ repair of a pipe, in accordance with an embodiment of the present invention.

Device 100 is comprises a polymer carrier plug 102 of general three-dimensional shape before use and at least one sealant composition carried therein (not seen). The carrier plug has a height $h_1$, width, $l_1$ and thickness w, before use. After use its shape is changed 110 and forms a head section 112 and tail section 114. The head section is of a length $h_2$ and diameter d. The head section is often of a cylindrical shape if it stoppers a circular hole or often termed pinhole. The tail section may be of a regular or irregular shape of height $h_3$ and width $l_2$. The dimensions after curing (use) depend on the degree of compacting/increasing density thereof. The density may typically increase 1-10 fold and dimensions decrease respectively. The density is typically non-uniform, being greater in the head section and lower in the tail section.

Figure 2:
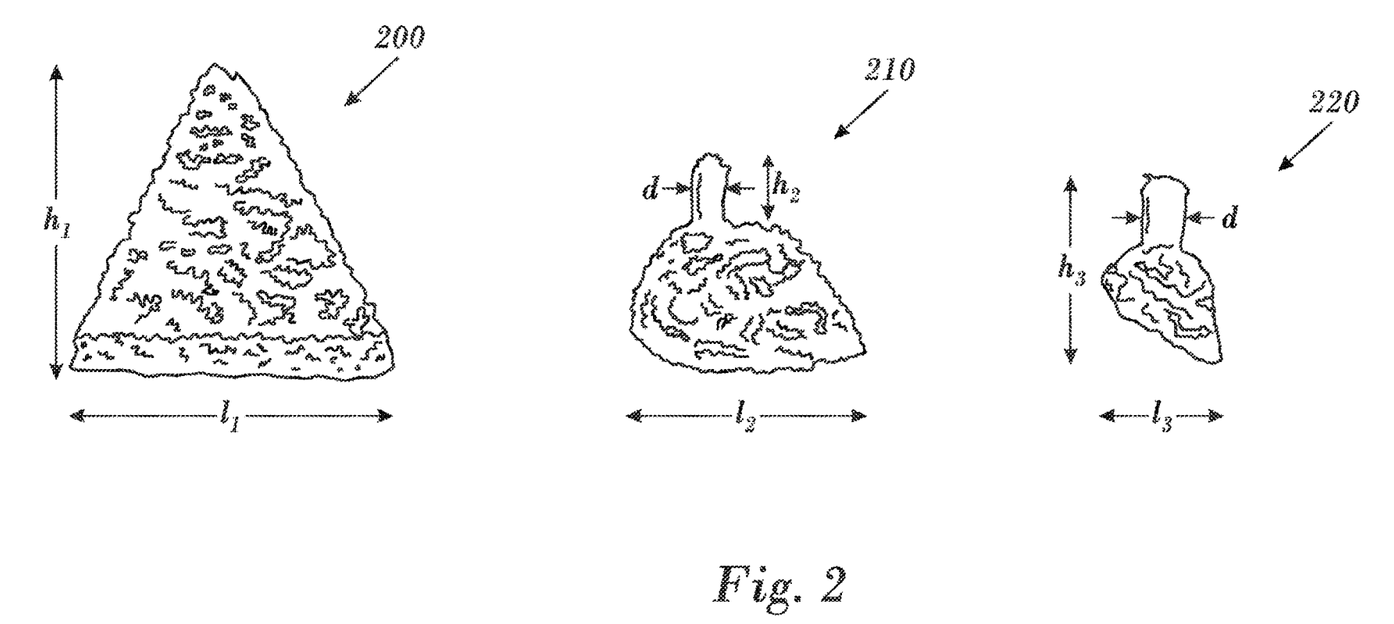
FIG. 2 shows a simplified image of a leakage plugging device for in situ repair of a pipe, in accordance with an embodiment of the present invention.

FIG. 2 shows further simplified images of a leakage plugging device for in situ repair of a pipe before use 210, during the curing process 210 and after the curing process 220.

Figure 3:
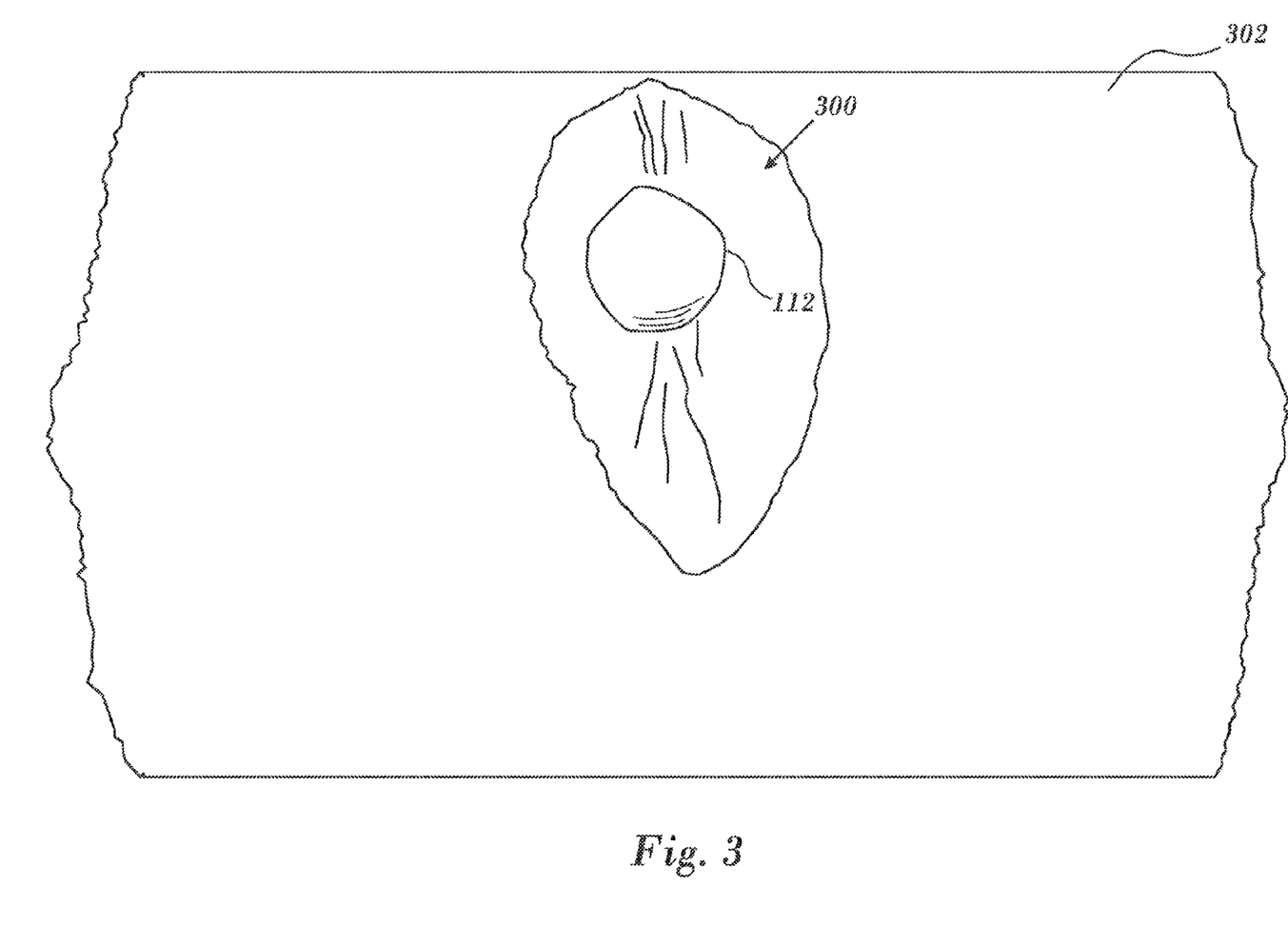
FIG. 3 shows a simplified schematic diagram of the end product of repair—the pipe from the outside after repair with a sealant plug, in accordance with an embodiment of the present invention.

FIG. 3 shows a simplified schematic diagram of the end product of repair—a pipe from the outside after repair 302 with a sealant plug 300 showing part of head section 112.

Figure 4:
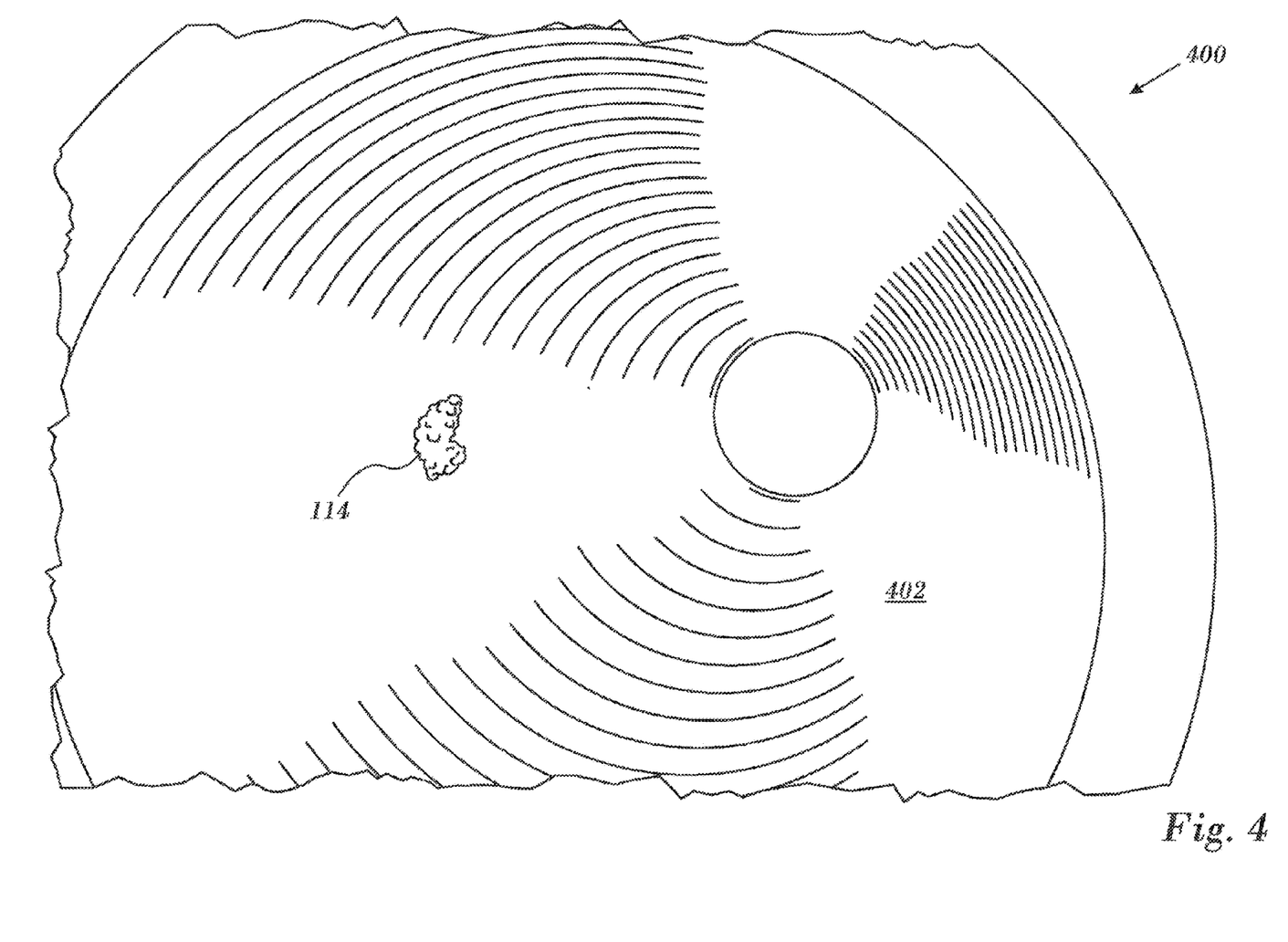
FIG. 4 shows a simplified schematic diagram of the end product of repair—the pipe from the inside after repair with a sealant plug, in accordance with an embodiment of the present invention.

FIG. 4 shows a simplified schematic diagram 400 of the end product of repair—the pipe from the inside after repair 402 with a sealant plug tail (partial view) 114, in accordance with an embodiment of the present invention.

Sealant compositions are introduced into carrier plugs (also called chips herein). The unloaded carrier plugs are constructed and configured to:

a. receive at least one sealant composition thereby forming a loaded carrier plug;
b. transport the at least one sealant composition along the pipe;
c. enable the at least one sealant composition to harden and/or expand/and or polymerize and/or be retained in situ at the leakage site (hole/crack/other) thereby forming a leakage plugging device.

The carrier plugs thus form a novel system for plugging/sealing leakage sites in pipes.

The sealant compositions of the present invention may further comprise other particles/solids which remain in the leakage site outside the carrier plugs.

A composite sealant composition may comprise:

a. one or more sealant compositions;
b. one or more type of loaded or unloaded carrier plugs;
c. optionally, at least one filler or particulate; and
d. other optional additives.

The composite sealant composition comprising some or all of the above, are adapted to be introduced into a pipeline by the help of special devices.

Figure 5:
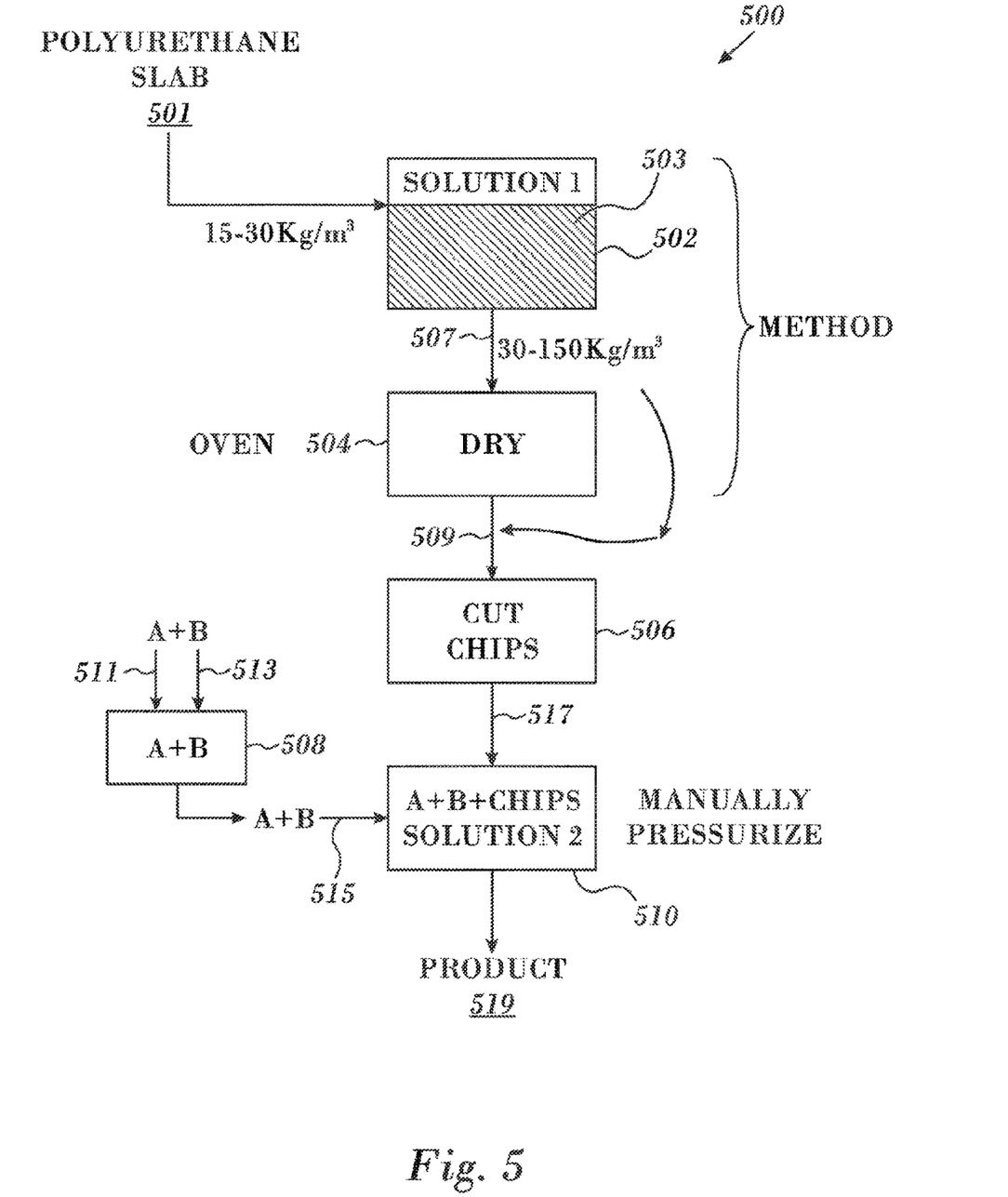
FIG. 5 shows a simplified flowchart of a method for the preparation of a sealant plug in accordance with an embodiment of the present invention.

Reference is now made to FIG. 5, which shows a simplified flowchart 500 of a method for the preparation of a sealant plug in accordance with an embodiment of the present invention.

In a first mixing step 502, a polymeric condensable material 501 is introduced into a first solution or suspension 503. The polymeric condensable material, may be, for example, polyurethane of a density of 15-30 kg/m³. According to some embodiments, the density is 15-18 kg/m³.

According to some embodiments, the first solution (solution 1, FIG. 5) is in accordance with that described in U.S. Pat. No. 6,057,378 (FIG. 3 and example 1), incorporated herein by reference.

According to some other embodiments, solution 503 comprises:
  a) At least one polymer, selected from polyurethane, polyacrylate, rubber, plastic, cellulose and combinations thereof in a weight ratio of 0-20% wt/wt.
  b) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 40-90% wt/wt.
  c) At least one surfactant selected from an ionic surfactant, an anionic surfactant, a detergent, an edible oil, an inedible oil and combinations thereof in a weight ratio of 0 to 4% wt/wt.
  d) At least one gelling agent selected from carrageenan, agar agar, hydroxymethylcellulose, hydroxyethyl cellulose, hydroxypropyl cellulose and combinations thereof in a weight ratio of 0 to 4% wt/wt.
  e) An antifoam in a weight ratio of 0 to 4% wt/wt.
  f) A coloring agent selected from a water soluble dye, a water insoluble dye, a paint, an oxide, a metal oxide and combinations thereof in a weight ratio of 0.00 to 1% wt/wt.

The resultant wet impregnated material 507 is typically of a density of 30-150 kg/m³.

The wet impregnated material 507 is then dried in a drying step 504. The drying step may be conducted in a belt dryer, tray drier, oven or any other commercially available drying method, known in the art. The resultant product is a dried impregnated material 509.

In parallel, a second solution or suspension 515 is prepared from a first composition 511 and a second composition 513 in a second mixing step 508. The ratio of A to B ratio is typically between 10:90 to 50:50, between 15:85 to 40:60, between 20:80 to 35:65, between 25:75 to 30:70. In one embodiment the ratio of A:B is 30:100 i.e. 30 parts of A to 100 parts of B.

The first composition acts as a hardener.

Some non-limiting examples of the first composition 511 (A) are:—
  a) A premixed hardening agent comprising polyoxypropylene triamine in a weight ratio of 50 to 90% wt/wt.
  b) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 2-20% wt/wt.
  c) A coloring agent selected from a water soluble dye, a water insoluble dye, a paint, an oxide, a metal oxide and combinations thereof in a weight ratio of 0.01 to 1% wt/wt.
  d) At least one surfactant selected from an ionic surfactant, an anionic surfactant, a detergent, an edible oil, an inedible oil and combinations thereof in a weight ratio of 0.01 to 15 wt/wt.
  e) At least one aqueous agent selected from sea water, tap water, distilled water, ice and combinations thereof in a weight ratio of 0.01 to 15% wt/wt.

Another non-limiting example of the first composition 511, FIG. 5, 611 FIGS. 6 and 711, FIG. 7 (A comprises hardener (CAS Nos. Diethylenetriamine 1140-40-0, Bisphenol A 80-05-7, Isophorondiamine 2855-13-2, and Benzyl alcohol 100-51-6):—

The ratio of A to B ratio is typically between 10:90 to 50:50, between 15:85 to 40:60, between 20:80 to 35:65, between 25:75 to 30:70. In one embodiment the ratio of A:B is 30:100 i.e. 30 parts of A to 100 parts of B.

The second composition (B) 513, FIG. 5 acts as a resinous composition. Some examples of the second composition (B) are:—
  a) At least one resinous agent selected from bisphenol A, glycidyl ether, bisphenol S, EPI-001 and combinations thereof in a weight ratio of 20 to 90% wt/wt.
  b) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 2-20% wt/wt.
  c) A coloring agent selected from a water soluble dye, a water insoluble dye, a paint, an oxide, a metal oxide and combinations thereof in a weight ratio of 0.01 to 1% wt/wt.
  d) At least one surfactant selected from an ionic surfactant, an anionic surfactant, a detergent, an edible oil, an inedible oil and combinations thereof in a weight ratio of 0.01 to 15 wt/wt.
  e) At least one aqueous agent selected from sea water, tap water, distilled water, ice and combinations thereof in a weight ratio of 0.01 to 15% wt/wt.

Another non-limiting example of the second composition (B) 513, FIG. 5, 613, FIGS. 6 and 713, FIG. 7, is Epoxy resin (comprising 35068-38-6 Phenol-Formaldehyde Polymer Glycidyl Ether and 68609-97-2 Alkyl (C12-C14) glycidyl ether) acts as a resinous composition.

Thereafter, in a cutting step 506, the dried impregnated material 509 is cut either manually or by machine into little chips in a cutting step 506 to form chips 517.

The chips are typically wedge-shaped having dimensions, such as 0.1-8 cm height, 0.1-6 cm width and 1-30 mm thickness. Additionally or alternatively, the chips may be arrow-shaped, cylindrical, cubic or any other suitable shape.

The chips are mixed with second solution or suspension 515 in a third mixing step 510 to form a plug product 519. According to some embodiments, the chips may be placed under pressure, and upon release, they will suck up some of the second solution or suspension. The plug product 519 may be used for plugging a hole or crack in a pipe.

Figure 6:
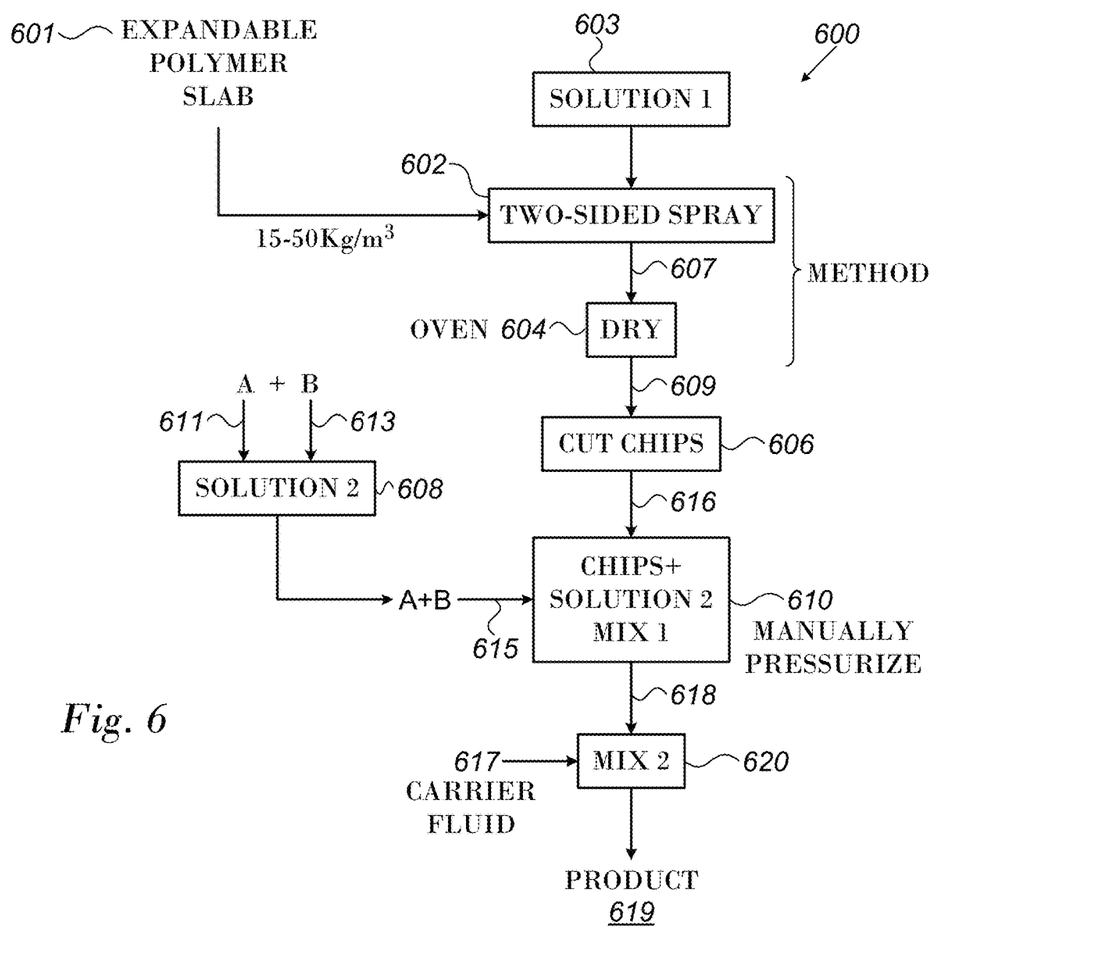
FIG. 6 shows a simplified flowchart of a method for the preparation of a sealant plug in accordance with an embodiment of the present invention.

Reference is now made to FIG. 6, which shows a simplified flowchart 600 of a method for the preparation of a sealant plug 619 in accordance with an embodiment of the present invention.

In a first spraying step 602, an expandable polymer material 601 is sprayed on both sides either manually or by a machine, as is known in the art. A first solution (solution 1) 603 is sprayed for 1-120 minutes to form a wet thickness of 200 g/m² on each side. The expandable polymer 601, may be, for example, polyurethane of a density of 15-50 kg/m³. According to some embodiments, the density is 35-50 kg/m³.

According to some embodiments, the first solution 603 (solution 1, FIG. 6) is in accordance with that described in U.S. Pat. No. 6,057,378 (FIG. 3 and example 1), incorporated herein by reference. According to other embodiments, the slab spray solution is in accordance with the composition in Table 1 herein below.

TABLE 1 composition of spray solution 603.

| CONSTITUENT | Weight percent range |
|---|---|
| vinyl acrylic copolymer emulsion | 3-30 |
| synthetic aluminum hydroxide | 20-80 |
| nonylphenol ethoxylate | 0-5 |
| hydroxyethyl cellulose | 0-5 |
| defoamer | 0-2 |
| pyrogenic silica | 0-5 |
| iron hydroxide hydroxy red | 0-5 |
| water | 10-80 |

The wet impregnated material 607 is then dried in a drying step 604. The drying step may be conducted in a belt dryer, tray drier, oven or any other commercially available drying method, known in the art. The resultant product is a dried impregnated material 609.

The dried impregnated material is then cut into chips in a cutting step 606.

The first measurement denotes the thickness of the polymer/polyurethane slab from which the chips are finally cut.

Since all slabs are cut, for example, into equilateral triangles to form chips, the second measurement denotes the height of the equilateral triangle.

Thus, the chips' 616 dimensions are, according to one non-limiting embodiment defined as follows:

10×20=10 mm (thickness)×20 mm (height of the equilateral triangle).

15×30 mm

20×40/45 (i.e. the height may come in two sizes) mm.

Solution 1 is sprayed on both sides of the slab and when dry contributes 2×200 g/m².

For example, before the application of the solution each of the 3 different slabs (601, 701, FIGS. 6 and 7) had a density of 40 kg/m³ meter and the following weight per square meter:

10 mm=>400 gm/square meter 15 mm=>600 gm/square meter 20 mm=>800 gm/square meter After application of the solution by spraying each of the 3 different slabs after drying had the following weight per square meter:

10 mm=>800 gm/square meter 15 mm=>1000 gm/square meter 20 mm=>1200 gm/square meter

TABLE 2

Weight data of slabs

| Slab thickness 601 | weight (gm) per square meter of slab before spray (601, 701) | weight (gm) per square meter of slab after spray (607, 707) |
|---|---|---|
| 10 mm | 400 | 800 |
| 15 mm | 600 | 1000 |
| 20 mm | 800 | 1200 |

In parallel, a second solution or suspension 615 is prepared from a first composition (A) 611 and a second composition (B) 613 in a second mixing step 608. The ratio of A to B ratio is typically between 10:90 to 50:50, between 15:85 to 40:60, between 20:80 to 35:65, between 25:75 to 30:70. In one embodiment the ratio of A:B is 30:100 i.e. 30 parts of A to 100 parts of B.

In a first mixing step (mix 1) 610, chips 616 and solution 2 (615) are mixed to form an intermediate product 618. The intermediate product 618 comprises the chips with solution 2 615 in their pores.

In a second mixing step (mix 2) 620, a carrier fluid composition 617 is mixed with the intermediate product to form a final product 619.

A non-limiting example of a carrier fluid composition 617 is provided in the Table 3 hereinbelow.

TABLE 3 typical carrier fluid composition

| Component | Weight percent range | CAS NUMBER(S) |
|---|---|---|
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |
| Vegetable oil | 5-30% | 120962-03-0 |
| water | 20-99.5% | |

Figure 7:
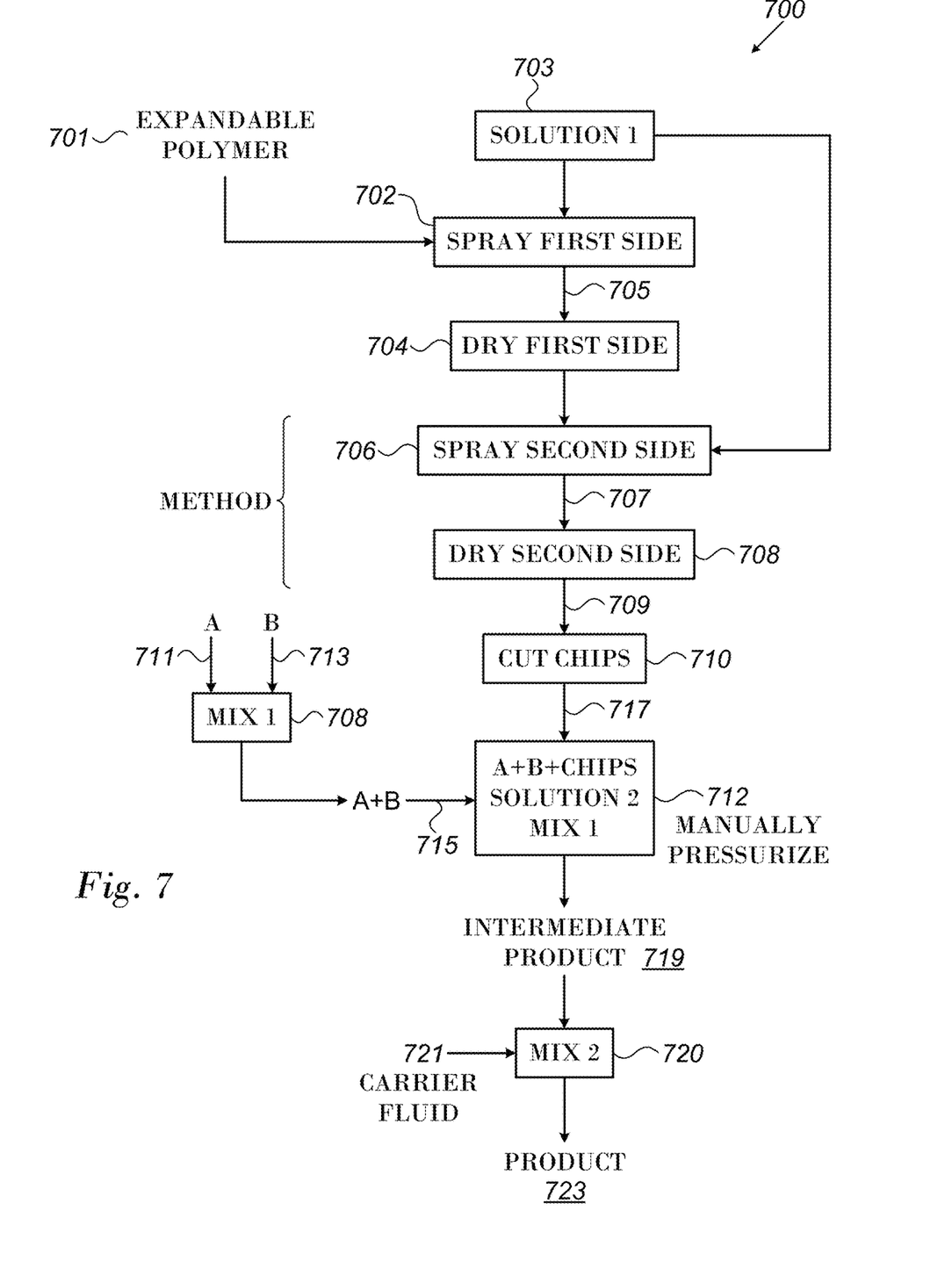
FIG. 7 shows another simplified flowchart of a method for the preparation of a sealant plug in accordance with an embodiment of the present invention.

Reference is now made to FIG. 7, which shows another simplified flowchart 700 of a method for the preparation of a sealant plug in accordance with an embodiment of the present invention.

In a first spraying step 702, an expandable polymer material 701 is sprayed on one side either manually or by a machine, as is known in the art. A first solution (solution 1) 703 is sprayed for 1-120 minutes to form a wet thickness of 200 g/m² on one side. The expandable polymer 701, may be, for example, polyurethane of a density of 15-50 kg/m³. According to some embodiments, the density is 35-50 kg/m³.

According to some embodiments, the first solution 703 (solution 1, FIG. 6) is in accordance with that described in U.S. Pat. No. 6,057,378 (FIG. 3 and example 1), incorporated herein by reference. According to other embodiments, the slab spray solution is in accordance with the composition in Table 4 herein below.

TABLE 4 composition of spray solution 703.

| CONSTITUENT | Weight percent range |
| --- | --- |
| vinyl acrylic compolymer emulsion | 5-15 |
| synthetic aluminum hydroxide | 40-60 |
| nonylphenol ethoxylate | 0-3 |
| hydroxyethyl cellulose | 0-3 |
| defoamer | 0-1 |
| pyrogenic silica | 0-1 |
| iron hydroxide hydroxy red | 0-1 |
| water | 10-40 |

Thereafter, the wet slab 705 is dried on a first side in a first drying step 704, by methods known in the art.

Solution 1, 703 is then sprayed onto a second side of slab 701 in a second spraying step 706 to form a double sprayed intermediate wet product 707.

This wet product is then dried in a second drying step 708 to form a dry product 709.

The wet product 707 is then dried in a second drying step 704. The drying step may be conducted in a belt dryer, tray drier, oven or any other commercially available drying method, known in the art. The resultant product is a dried impregnated material 709.

The dried impregnated material is then cut into chips in a cutting step 710.

The first measurement denotes the thickness of the polymer/polyurethane slab from which the chips are finally cut.

Since all slabs are cut, for example, into equilateral triangles to form chips, the second measurement denotes the height of the equilateral triangle.

Thus, the chips' 717 dimensions are, according to one non-limiting embodiment defined as follows:

10×20=10 mm (thickness)×20 mm (height of the equilateral triangle).

15×30 mm

20×40/45 (i.e. the height may come in two sizes) mm.

Solution 1 is sprayed on both sides of the slab and when dry contributes 2×200 g/m$^2$.

For example, before the application of the solution each of the 3 different slabs (601, 701, FIGS. 6 and 7) had a density of 40 kg/m$^3$ meter and the following weight per square meter:

10 mm=>400 gm/square meter
15 mm=>600 gm/square meter
20 mm=>800 gm/square meter After application of the solution by spraying each of the 3 different slabs after drying had the following weight per square meter:

10 mm=>800 gm/square meter
15 mm=>1000 gm/square meter
20 mm=>1200 gm/square meter

TABLE 5

Weight data of slabs

| Slab thickness 601 | weight (gm) per square meter of slab before spray (601, 701) | weight (gm) per square meter of slab after spray (607, 707) |
| --- | --- | --- |
| 10 mm | 400 | 800 |
| 15 mm | 600 | 1000 |
| 20 mm | 800 | 1200 |

In parallel, a second solution or suspension 715 is prepared from a first composition 711 and a second composition 713 in a second mixing step 708. The ratio of A to B ratio is typically between 10:90 to 50:50, between 15:85 to 40:60, between 20:80 to 35:65, between 25:75 to 30:70. In one embodiment the ratio of A:B is 30:100 i.e. 30 parts of A to 100 parts of B.

In a first mixing step (mix 1) 712, chips 717 and solution 2 (715) are mixed to form an intermediate product 719. The intermediate product 719 comprises the chips with solution 2 715 in their pores.

In a second mixing step (mix 2) 720, a carrier fluid 721 (see table 2 hereinabove) is mixed with the intermediate product 719 to form a final product 723.

Figure 8:
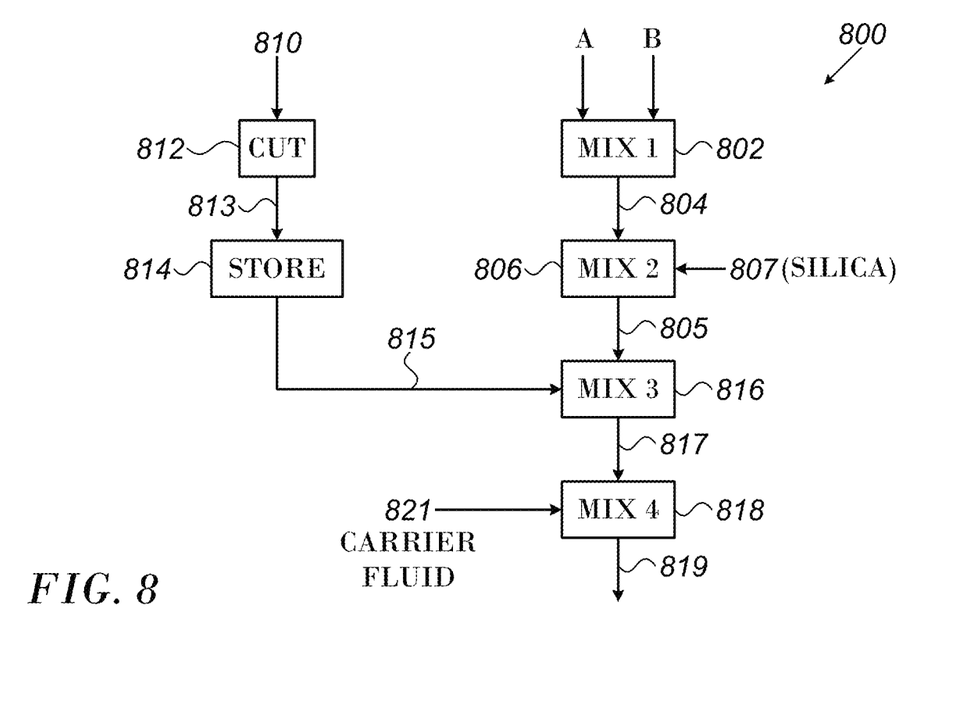
FIG. 8 shows a simplified flowchart of a method for the preparation of a fiber plug in a carrier fluid composition in accordance with an embodiment of the present invention.

Reference is now made to FIG. 8, which shows a simplified flowchart 800 of a method for the preparation of a fiber plug in a carrier fluid composition 819 in accordance with an embodiment of the present invention.

One or more natural fibers 810 are cut in a cutting step 812.

The natural fibers may comprise fibers of a plant, animal, mineral, petrochemical origin and combinations thereof.

The fibers collected from the seeds of various plants are known as seed fibers. Fibers collected from the cells of a leaf are known as leaf fibers, such as ex.-pina, banana, etc.

Bast fibers are collected from the outer cell layers of the plant's stem. These fibers are used for durable yarn, fabric, packaging, and paper. Some examples are flax, jute, kenaf, industrial hemp, ramie, rattan and vine fibers.

For example, the hemp fiber used may comprise one or more of the following: NM8.5/1 (count 8.5 with 1 ply), NM8.5/3 (count 8.5 with 3 ply) and NM8.5/5 (count 8.5 with 5 ply) 100% hemp long fiber yarn ringspun/OE Bleached. Eco-Friendly, Anti-Bacteria, Anti-UV, Moisture-Absorbent Fibers collected from the fruit of the plant, e.g. coconut fiber (coir) bers from the stalks of plants, e.g. straws of wheat, rice, barley, bamboo and straw.

Plant fibers are rich in cellulose and they are a cheap, easily renewable source of fibers with the potential for polymer reinforcement. The presence of surface impurities and the large amount of hydroxyl groups make plant fibers less attractive for reinforcement of polymeric materials. Hemp, sisal, jute, and kapok fibers were subjected to alkalization by using sodium hydroxide.

The nanofibers are bundles of cellulose fibers of widths ranging between 30 and 100 nm and estimated lengths of several micrometers. The chemical analysis showed that selective chemical treatments increased the α-cellulose content of hemp nanofibers from 75 to 94%.

Natural fibers may include one or more of hemp, jute, flax cotton, soft wood, Ramie, Sisal and Bamboo.

Typically, the natural fibers 810 are received as a long yarn. The long yarn may be one-ply, two-ply, three-ply, four-ply or any number of ply or combinations thereof. The long yarn are cut in a cutting step 812 to be of easily manageable dimensions. For example, 8.5 mm and 1-ply. The cut fibers 813 may be stored in a storing step 814 before use.

In one non-limiting example, hemp yarn has a size of Nm 10 (Nm 10 yarn=10,000 meters per kilogram, or about 4,960 yards per pound) from single to multiple plies of 2, 3, 6 and 12 in either natural or bleached (using peroxide) Made from earth-friendly wet spun hemp, these yarns are smooth and durable The yarns may be provided on spools or in packages and may be single-ply, 2-ply, 3-ply, 5-ply, 6-ply and 12-ply or combinations thereof. In some cases, the following types are used: NM8.5/1 (count 8.5 with 1 ply), NM8.5/3 (count 8.5 with 3 ply) and NM8.5/5 (count 8.5 with 5 ply) 100% hemp long fiber yarn ringspun/oe bleached. eco-friendly, anti-bacterial, anti-UV and moisture-absorbent.

Composition A comprises hardener (CAS Nos. Diethylenetriamine 1140-40-0, Bisphenol A 80-05-7, Isophorondiamine 2855-13-2, and Benzyl alcohol 100-51-6).

Composition B comprises Epoxy resin (comprising 35068-38-6 Phenol-Formaldehyde Polymer Glycidyl Ether and 68609-97-2 Alkyl (C12-C14) glycidyl ether) and acts as a resinous composition.

A first composition A and a second composition B are mixed in a first mixing step 802. The ratio of A to B ratio is typically between 10:90 to 50:50, between 15:85 to 40:60, between 20:80 to 35:65, between 25:75 to 30:70. In one embodiment the ratio of A:B is 30:100 i.e. 30 parts of A to 100 parts of B. A and B are as defined herein. The resultant first mix 804 is then mixed in a second mixing step 806 with a silica formulation 807.

In a second mixing step 806, ground silica formulation 807 (comprising cristobalite (CAS Number 4808-60-7), Aluminum oxide CAS Number: 1344-28-1, Iron(III) oxide 1309-37-1 and Titanium(IV) oxide, anatase 1317-70-0) is mixed with first mix 804 to form a second mix 805. The second mix 805 is mixed with cut fibers 815 to form a third mix 817 in a third mixing step 816.

Typically, the ratio of silica formulation 807 to first mix 804 is 0.1:0.9, 0.2:0.8, 0.3:0.7, 0.4:0.6 or 0.5:0.5. Preferably the ratio is between 0.3:0.7 to 0.5:0.5. The second mix 805 is mixed with cut fibers 815 to form a third mix 817 in a third mixing step 816. Typically, the ratio of cut fibers 815 to second mix 805 is 0.01:0.99, 0.05:0.95, 0.1:0.9, 0.15:0.85 or 0.5:0.5. Preferably the ratio is between 0.03:0.97 to 0.15:0.85.

According to some embodiments of the present invention, composition A comprises hardener (CAS Nos. Diethylenetriamine 1140-40-0, Bisphenol A 80-05-7, Isophorondiamine 2855-13-2, and Benzyl alcohol 100-51-6).

According to some embodiments of the present invention, composition B comprises Epoxy resin (35068-38-6 Phenol-Formaldehyde Polymer Glycidyl Ether and 68609-97-2 Alkyl (C12-C14) glycidyl ether) and acts as a resinous composition.

According to some embodiments of the present invention, first composition A and a second composition B are mixed in a first mixing step 802.

TABLE 6 ingredients in composition A

| | WEIGHT PERCENT % | CAS NO. |
|---|---|---|
| Diethylenetriamine | 10-50 | 1140-40-0 |
| Bisphenol A | 10-30 | 80-05-7 |
| Isophorondiamine | 20-40 | 2855-13-2 |
| Benzyl alcohol | 20-50 | 100-51-6 |
| TOTAL | 100 | |

In another embodiment of the present invention, the formulation of composition A appears in table 7.

TABLE 7 ingredients in composition A

| | WEIGHT PERCENT % | CAS NO. |
|---|---|---|
| Diethylenetriamine | 32.1 | 1140-40-0 |
| Bisphenol A | 11.5 | 80-05-7 |
| Isophorondiamine | 34.5 | 2855-13-2 |
| Benzyl alcohol | 21.9 | 100-51-6 |
| TOTAL | 100 | |

According to some embodiments of the present invention, composition B comprises Epoxy resin (comprising, for example, 35068-38-6 Phenol-Formaldehyde Polymer Glycidyl Ether and 68609-97-2 Alkyl (C12-C14) glycidyl ether) and acts as a resinous composition.

TABLE 8 ingredients in composition B

| | WEIGHT PERCENT % | CAS NO. |
|---|---|---|
| Phenol-Formaldehyde Polymer Glycidyl Ether | 0-20 | 35068-38-6 |
| Alkyl (C12-C14) glycidyl ether) | 5-15 | 68609-97-2 |
| YD-128 | 50-96% | 25068-38-6 |
| Dynaslan glymo | 0-1 | 2530-83-8 |
| Byk 066 | 0-4 | 108-83-8 |
| TOTAL | 100 | |

In other embodiments of the present invention, the formulation of composition B appears in tables 8 and 9.

TABLE 9 ingredients in composition B

| | WEIGHT PERCENT % | CAS NO. |
|---|---|---|
| Phenol-Formaldehyde Polymer Glycidyl Ether | 3.2 | 35068-38-6 |
| Alkyl (C12-C14) glycidyl ether) | 11.5 | 68609-97-2 |
| YD-128 | 82.7 | 25068-38-6 |
| Dynaslan glymo | 0.5 | 2530-83-8 |
| Byk 066 | 2.1 | 108-83-8 |
| TOTAL | 100 | |

TABLE 10

Example of a mix 3 (817) composition

| NAME | WEIGHT PERCENT RANGE |
|---|---|
| Composition A | 5-30 |
| Composition B | 15-70 |
| Composition 807 | 15-70 |
| Cut fibers 815 | 1-20 |
| TOTAL | 100 |

A carrier fluid composition 821, as exemplified in Table 3 is introduced and mixed with third mix 817 in a fourth mixing step 818.

A non-limiting example of a carrier fluid composition 821 is provided in Table 11 hereinbelow.

TABLE 11

Example of a carrier fluid composition.

| Component | Weight percent range | CAS NUMBER(S) |
| --- | --- | --- |
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |
| Vegetable oil | 5-30% | 120962-03-0 |
| water | 20-99% | |

Typically, the ratio of third mix 817 to carrier fluid composition 821 is 0.1:0.9, 0.2:0.8, 0.3:0.7, 0.4:0.6, 0.5:0.5, 0.6:0.4, 0.7:0.3, 0.8:0.2 or 0.9:0.1. Preferably the ratio is between 0.3:0.7 to 0.5:0.5.

A final carrier fluid composition comprising fibers 819 (also called fiber-in-sealant composition) is then ready for use.

TABLE 12

Example of Fiber-in-Sealant composition 819

| Component | Weight percent range |
| --- | --- |
| A | 0.5-4 |
| B | 1-7 |
| Cut fibers (815) | 0.5-5 |
| Silica (807) | 1-6 |
| Carrier fluid 821 | 85-98 |
| total | 100 |

Some examples of the sealant compositions are provided in the following examples.

Example 1

In this example, the values percent of the compositions A and B, and exemplary weight concentration ranges.
Composition A (%):
Bisphenol A 50.0-70.0(%)
Glycidyl Ether 7.0-20.0(%)
Inert powdered filler 10.0-20.0(%)
Clay 0-2.0(%)
A detergent precursor 0-5.0(%)
A corrosion resistance provider 0-3.0(%)
Hydrophobic liquid filler 2.0-5.0(%)
Inert liquid filler 4.0-7.0(%)
Silicon dioxide 0.5-1.0(%)
Iron oxide hydroxyl 0.1-0.5(%)
Composition B (%):
Diethylene thiamine 0-23.0(%)
4.4-isopropylidenediphenol 0-16.0(%)
Isophorondiamine 0-31.0(%)
Benzyl alcohol 0-31.0(%)
A surfactant 0-1.0(%)
Detergent precursor 0-5.0(%)
Inert powdered filler 5-15.0(%)
Polyoxypropylene thiamine 0-70.0(%)
A corrosion resistance provider 0-5.0(%)
Clay 0-4.0(%)
4-nonylphenol, branched 0-15.0(%)
Silicon dioxide 0.2-2.0(%)
Iron oxide hydroxyl 0-0.6(%)
Inert liquid filler 1-6.0(%)
Hydrophobic liquid filler 1.0-6.0(%)

These materials once cured serve to provide robust long term plugging of the leakage with a longevity of similar order of magnitude to the remaining useful life of the host pipe. They also serve to withstand changing environmental conditions. The cured product having a similar thermal coefficient in order of magnitude to the host pipe typically expands and contracts under changing temperatures in unison with the host pipe so as not to create a secondary leak under these conditions.

Example 2

This example shows the composition of the sealant plug covering the hole in the pipe and the pipe remains in the field of repair of.

| CAS # | Name component material | Content, % |
| --- | --- | --- |
| 80-05-7 | Bisphenol A | 39 |
| 668609-97-2 | Glycidyl ether | 11 |
| 21645-51-2 | Inert powder filler (synthetic aluminum | 20 |
| 67-53-0 | A corrosion resistance provider | 3 |
| 120962-03 | Rapeseed oil | 6.1 |
| 112945-52 | Silicon dioxide | 1 |
| 20344-49 | Iron oxide hydroxyl | 0.3 |
| 1140-40-0 | Diethylene thiamine | 3.5 |
| 80-05-74.4 | Isopropylidenediphenol | 2.5 |
| 2855-13-2 | Isophorondiamine | 4 |
| 100-51-6 | Benzyl alcohol | 4 |
| 9009-54-5 | Polyurethane | 2 |
| 9003-04-7 | Polyacrylate (Tamcril-15) | 3 |
| 9004-62-9 | Berol NP-10 (9) | 0.4 |
| 9004-62-0 | Hydroxyethyl cellulose | 0.1 |
| 8050-81-5 | Antifoam APRU DF-7010 | 0.1 |

The references cited herein teach many principles that are applicable to the present invention. Therefore the full contents of these publications are incorporated by reference herein where appropriate for teachings of additional or alternative details, features and/or technical background. It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A method for sealing a leakage at a remote site in a pipe, the method comprising:
   a. introducing a fluid carrier composition comprising:
      i. a hardener;
      ii. a resin; and
      iii. at least one of a multiplicity of plugging devices made of a deformable material having pores and carrying a first density enhancing dried composition including at least one polymer; and a multiplicity of cut fibers;

into the pipe at said site under pressure; and
b. allowing said fluid carrier composition to transport said at least one of said plugging devices and said cut fibers to said remote site, such that said multiplicity of plugging devices and said multiplicity of cut fibers penetrates said leakage, forming at least one hardened increased-density fiber, thereby sealing and curing said leakage.

2. A method according to claim 1, further comprising:
c. curing said resin at said remote site.

3. A method according to claim 2, further comprising forming at least one hardened increased-density device.

4. A method according to claim 2, wherein said curing step occurs within twenty minutes to 4 hours.

5. A method according to claim 1, further comprising:
d. removing at least one of excess plugging devices and excess fibers and said carrier composition from said pipe after said allowing step.

6. A method according to claim 1, wherein said sealing comprises a curing step which takes 0.2 to ten hours.

7. A method according to claim 6, wherein said carrier plug or plugs are adapted to form a wedge shape.

8. A method according to claim 1, wherein said carrier plug or plugs are adapted to conform at least in part to a shape of said leakage at said remote site.

9. A method according to claim 1, wherein said allowing step further comprises condensing said at least one of said devices at said leakage.

10. A method according to claim 1, wherein said leakage is selected from the group consisting of a hole, a crack, a vein, a crater and combinations thereof.

11. A method according to claim 10, wherein said leakage leaks 10 to 30,000 L/hr.

12. A method according to claim 11, wherein said leakage leaks 50 to 5000 L/hr.

13. A method for sealing multiple leakages at remote sites in a pipeline, the method comprising:
a. introducing a fluid carrier composition comprising:
i. a hardener;
ii. a resin; and
iii. at least one of a multiplicity of plugging devices made of a deformable material having pores and carrying a first density enhancing dried composition including at least one polymer and a multiplicity of cut fibers,
into the pipeline under pressure; and
b. allowing said fluid carrier composition to transport said at least one of said plugging devices and said cut fibers to said remote sites, such that said multiplicity of plugging devices and said multiplicity of cut fibers penetrates a leakage, forming at least one hardened increased-density fiber thereby sealing at least some of said leakages.

14. A method according to claim 13, wherein said allowing step comprises sealing all of said leakages.

15. A method according to claim 13, further comprising:
c. curing said resin within said devices at said remote sites, thereby forming a plurality of hardened increased-density devices.

16. A method according to claim 15, further comprising repeating steps a and b.

17. A method according to claim 16, further comprising repeating step c after said steps a and b.

18. A method according to claim 15, further comprising
d. flushing said fluid carrier composition from said pipe.

19. A method according to claim 18, wherein said flushing step leaves said pipe sealed with said hardened increased-density devices.

* * * * *